US012348888B2

(12) United States Patent
Sadek et al.

(10) Patent No.: US 12,348,888 B2
(45) Date of Patent: Jul. 1, 2025

(54) DEPTH GUIDED LIFT, SHOOT, SPLAT FOR CONVERTING CAMERA IMAGES TO BIRD'S EYE VIEW DOMAIN

(71) Applicant: QUALCOMM Incorporated, San Diego, CA (US)

(72) Inventors: Ahmed Kamel Sadek, San Diego, CA (US); Soyeb Noormohammed Nagori, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/467,197

(22) Filed: Sep. 14, 2023

(65) Prior Publication Data
US 2025/0097372 A1   Mar. 20, 2025

(51) Int. Cl.
*H04N 5/262* (2006.01)
*B60W 60/00* (2020.01)
(Continued)

(52) U.S. Cl.
CPC ........ *H04N 5/2624* (2013.01); *B60W 60/001* (2020.02); *G06T 7/50* (2017.01);
(Continued)

(58) Field of Classification Search
CPC ........ H04N 5/2624; H04N 7/181; G06T 7/50; G06T 2207/20081; G06T 2207/20212; G06T 2207/20076; G06T 2207/30252; G06T 2207/20084; B60W 60/001; B60W 2556/45
See application file for complete search history.

(56) References Cited

U.S. PATENT DOCUMENTS

2017/0109940 A1\* 4/2017 Guo .......................... G06T 7/30
2020/0160559 A1\* 5/2020 Urtasun ................. G06V 10/82
(Continued)

OTHER PUBLICATIONS

Liu Z., et al., "BEVFusion: Multi-Task Multi-Sensor Fusion with Unified Bird's-Eye View Representation", arXiv:2205.13542v2[cs.Cv] Jun. 16, 2022, 12 Pages.
(Continued)

*Primary Examiner* — Anner Holder
(74) *Attorney, Agent, or Firm* — Shumaker & Sieffert, P.A.

(57) ABSTRACT

An apparatus includes a memory for storing image data; and processing circuitry in communication with the memory. The processing circuitry is configured to generate a respective context vector for each pixel of the image data; generate a respective initial depth distribution for each pixel of the image data; and determine, for each pixel of the image data, a respective predicted depth peakiness factor based on the respective initial depth distribution, the respective predicted depth peakiness factor indicating a confidence of a depth for the pixel. The processing circuitry is also configured to determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

30 Claims, 6 Drawing Sheets

(51) Int. Cl.
*G06T 7/50* (2017.01)
*H04N 7/18* (2006.01)

(52) U.S. Cl.
CPC ......... *H04N 7/181* (2013.01); *B60W 2556/45* (2020.02); *G06T 2207/20076* (2013.01); *G06T 2207/20081* (2013.01); *G06T 2207/20084* (2013.01); *G06T 2207/20212* (2013.01); *G06T 2207/30252* (2013.01)

(56) References Cited

U.S. PATENT DOCUMENTS

| | | | |
|---|---|---|---|
| 2020/0279388 A1* | 9/2020 | Higo | H04N 13/128 |
| 2021/0073953 A1* | 3/2021 | Lee | G06N 3/084 |
| 2021/0398338 A1* | 12/2021 | Philion | G06V 10/774 |
| 2023/0274489 A1* | 8/2023 | Zhang | G06T 15/00 |
| 2023/0274490 A1* | 8/2023 | Zhang | G06T 7/50 345/419 |
| 2024/0096105 A1* | 3/2024 | Zhao | G06V 10/44 |
| 2024/0149866 A1* | 5/2024 | Adiththan | B60W 30/06 |

OTHER PUBLICATIONS

Philion J., et al., "Lift, Splat, Shoot: Encoding Images from Arbitrary Camera Rigs by Implicitly Unprojecting to 3D", arXiv:2008.05711v1 [cs.CV], Aug. 13, 2020, pp. 1-17.

Roddick T., et al., "Orthographic Feature Transform for Monocular 3D Object Detection", arXiv:1811.08188v1 [cs.CV], Nov. 20, 2018, pp. 1-10.

* cited by examiner

DEPTH GUIDED LIFT, SHOOT, SPLAT FOR CONVERTING CAMERA IMAGES TO BIRD'S EYE VIEW DOMAIN

TECHNICAL FIELD

This disclosure relates to sensor systems, including image projections for use in advanced driver-assistance systems (ADAS).

BACKGROUND

An autonomous driving vehicle is a vehicle that is configured to sense the environment around the vehicle, such as the existence and location of other objects, and to operate without human control. An autonomous driving vehicle may include cameras that produce image data that may be analyzed to determine the existence and location of other objects around the autonomous driving vehicle. A vehicle having advanced driver-assistance systems (ADAS) is a vehicle that includes systems which may assist a driver in operating the vehicle, such as parking or driving the vehicle.

SUMMARY

The present disclosure generally relates to techniques and devices for generating bird's eye view (BEV) image data features based on image data. In particular, this disclosure describes techniques that use depth guidance to improve a lift stage of a lift, splat, shoot (LSS) process used to generate a BEV projection from a plurality of camera images. In a lift stage of the LSS process, an image may be "lifted" from a local 2-dimensional coordinate system to a 3-dimensional frame that may be shared across multiple cameras. A number of depth bins of a depth distribution for each pixel may be created and the depth distribution may be multiplied with a context vector for each pixel. This may produce a very large output volume since for each frame of each camera an output proportional to the number of pixels times the number of depth bins times the size of the context vector. For a 2 megapixel image with 118 depth bins and a context vector of length 80, this may result in about 1.8 GB of data per frame. Handling such a large volume may require expensive external memory transfer in terms of execution cycles with higher latency and greater power use.

In accordance with the techniques of this disclosure, a system may determine a predicted depth peakiness factor for each pixel of an image and use the predicted depth peakiness factor to reduce the size of the lift layer output. The system may use the predicted depth peakiness factor to select a confidence level for the depth distribution (depth vector). For a high confidence level, the system may use a single depth value to be multiplied with the context vector. This results in a substantial reduction in data size since the effective size of the depth distribution is reduced to one. For a low confidence level, the system may select a uniform depth distribution to be multiplied with the context vector. A uniform distribution also reduces the size of the data that needs to be stored since a single value is used for each depth bin of the depth distribution (depth vector). For a moderate confidence level, a relatively low number, N, of non-zero bin values, such as 3-4 may be used to be multiplied with the context vector. This results in a substantial reduction in data size since the effective size of the depth distribution is reduced to N.

The techniques of this disclosure may result in a significant reduction of the size of data used to produce BEV images and thus may make the operation of ADAS devices more feasible and efficient. By reducing the data size, techniques of this disclosure reduce processor burdens, data transfer delays, and power usage.

In one example, an apparatus for processing image data, the apparatus includes a memory for storing the image data; and processing circuitry in communication with the memory, wherein the processing circuitry is configured to generate a respective context vector for each pixel of the image data; generate a respective initial depth distribution for each pixel of the image data; determine, for each pixel of the image data, a respective predicted depth peakiness factor based on the respective initial depth distribution, the respective predicted depth peakiness factor indicating a confidence of a depth for the pixel; determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

In another example, a method includes generating a respective context vector for each pixel of image data; generating a respective initial depth distribution for each pixel of the image data; determining, for each pixel of the image data, a respective predicted depth peakiness factor based on the respective initial depth distribution, the respective predicted depth peakiness factor indicating a confidence of a depth for the pixel; determining a respective final depth distribution for each pixel based on the respective predicted depth peakiness factor and the respective initial depth distribution; and generating a bird's eye view (BEV) image using the respective final depth distribution for each pixel of the image data and the respective context vector for each pixel of the image data.

In another example, a non-transitory computer-readable medium stores instructions that, when executed, cause processing circuitry to: generate a respective context vector for each pixel of the image data; generate a respective initial depth distribution for each pixel of the image data; determine, for each pixel of the image data, a respective predicted depth peakiness factor based on the respective initial depth distribution, the respective predicted depth peakiness factor indicating a confidence of a depth for the pixel; determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

In another example, an apparatus includes means for generating a respective context vector for each pixel of image data; means for generating a respective initial depth distribution for each pixel of the image data; means for determining, for each pixel of the image data, a respective predicted depth peakiness factor based on the respective initial depth distribution, the respective predicted depth peakiness factor indicating a confidence of a depth for the pixel; means for determining a respective final depth distribution for each pixel based on the respective predicted depth peakiness factor and the respective initial depth distribution; and means for generating a bird's eye view (BEV) image using the respective final depth distribution for each pixel of the image data and the respective context vector for each pixel of the image data.

The details of one or more examples are set forth in the accompanying drawings and the description below. Other features, objects, and advantages will be apparent from the description, drawings, and claims.

DETAILED DESCRIPTION

Figure 1:
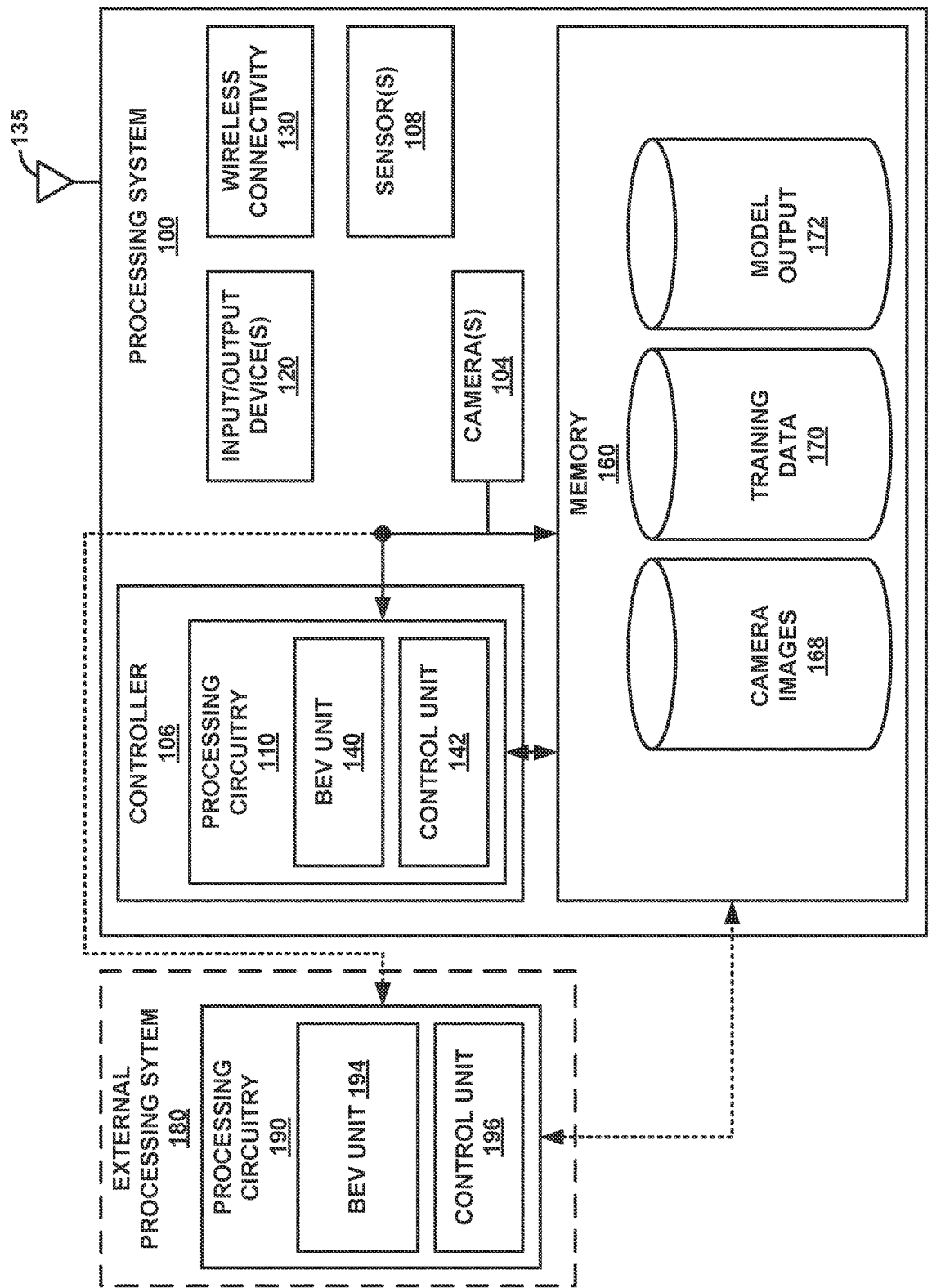
FIG. 1 is a block diagram illustrating an example processing system, in accordance with one or more techniques of this disclosure.

Camera systems may be used in various different robotic, vehicular, and virtual reality (VR) applications. One such vehicular application is an advanced driver assistance system (ADAS). ADAS may be a system that uses camera technology to improve driving safety, comfort, and overall vehicle performance.

In some examples, the camera-based system is responsible for capturing high-resolution images and processing them in real time. The output images of such a camera-based system may be used in applications such as depth estimation, object detection, and/or pose detection, including the detection and recognition of objects, such as other vehicles, pedestrians, traffic signs, and lane markings. Cameras may be used in vehicular, robotic, and VR applications as sources of information that may be used to determine the location, pose, and potential actions of physical objects in the outside world.

The present disclosure generally relates to techniques and devices for generating bird's eye view (BEV) image data features based on image data. In particular, this disclosure describes techniques that use depth guidance to improve a lift stage of a lift, splat, shoot (LSS) process used to generate a BEV projection from a plurality of camera images. In a lift stage of the LSS process, an image may be "lifted" from a local 2-dimensional coordinate system to a 3-dimensional frame that may be shared across multiple cameras. A number of depth bins of a depth distribution for each pixel may be created and the depth distribution may be multiplied with a context vector for each pixel. This may produce a very large output volume since for each frame of each camera an output proportional to the number of pixels times the number of depth bins times the size of the context vector. For a 2 megapixel image with 118 depth bins and a context vector of length 80, this may result in about 1.8 GB of data per frame. Handling such a large volume may require expensive external memory transfer in terms of execution cycles with higher latency and greater power use.

In accordance with the techniques of this disclosure, a system may determine a predicted depth peakiness factor for each pixel of an image and use the predicted depth peakiness factor to reduce the size of the lift layer output. The system may use the predicted depth peakiness factor to select a confidence level for the depth distribution (depth vector). For a high confidence level, the system may use a single depth value to be multiplied with the context vector. This results in a substantial reduction in data size since the effective size of the depth distribution is reduced to one. For a low confidence level, the system may select a uniform depth distribution to be multiplied with the context vector. A uniform distribution also reduces the size of the data that needs to be stored since a single value is used for each depth bin of the depth distribution (depth vector). For a moderate confidence level, a relatively low number, N, of non-zero bin values, such as 3-4 may be used to be multiplied with the context vector. This results in a substantial reduction in data size since the effective size of the depth distribution is reduced to N.

The techniques of this disclosure may result in a significant reduction of the size of data used to produce BEV images and thus may make the operation of ADAS devices more feasible and efficient. By reducing the data size, techniques of this disclosure reduce processor burdens, data transfer delays, and power usage.

FIG. 1 is a block diagram illustrating an example processing system 100, in accordance with one to more techniques of this disclosure. Processing system 100 may be used in an apparatus, such as a vehicle, including an autonomous driving vehicle or an assisted driving vehicle (e.g., a vehicle having an advanced driver-assistance system (ADAS) or an "ego vehicle"). In such an example, processing system 100 may represent an ADAS. In other examples, processing system 100 may be used in robotic applications, virtual reality (VR) applications, or other kinds of applications that may include both a camera and a LiDAR system. The techniques of this disclosure are not limited to vehicular applications. The techniques of this disclosure may be applied by any system that processes image data and/or position data.

Processing system 100 may include camera(s) 104, controller 106, one or more sensor(s) 108, input/output device(s) 120, wireless connectivity component 130, and memory 160. Camera(s) 104 may be any type of camera configured to capture video or image data in the environment around processing system 100 (e.g., around a vehicle). In some examples, processing system 100 may include multiple cameras 104. For example, camera(s) 104 may include a front-facing camera (e.g., a front bumper camera, a front windshield camera, and/or a dashcam), a back-facing camera (e.g., a backup camera), side-facing cameras (e.g., cameras mounted in sideview mirrors). Camera(s) 104 may be a color camera or a grayscale camera. In some examples, camera(s) 104 may be a camera system including more than one camera sensor. Camera(s) 104 may, in some examples, be configured to collect camera images 168.

Wireless connectivity component 130 may include sub-components, for example, for third generation (3G) connectivity, fourth generation (4G) connectivity (e.g., 4G Long Term Evolution (LTE)), fifth generation (5G) connectivity (e.g., 5G or New Radio (NR)), Wi-Fi connectivity, Bluetooth connectivity, and other wireless data transmission standards. Wireless connectivity component 130 is further connected to one or more antennas 135.

Processing system 100 may also include one or more input and/or output devices 120, such as screens, touch-sensitive surfaces (including touch-sensitive displays), physical buttons, speakers, microphones, and the like. Input/ output device(s) 120 (e.g., which may include an I/O controller) may manage input and output signals for processing system 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processing circuitry 110). In some cases, a user may interact with a device via input/output device(s) 120 or via hardware components controlled by input/output device(s) 120.

Controller 106 may be an autonomous or assisted driving controller (e.g., an ADAS) configured to control operation of processing system 100 (e.g., including the operation of a vehicle). For example, controller 106 may control acceleration, braking, and/or navigation of a vehicle through the environment surrounding the vehicle. Controller 106 may include one or more processors, e.g., processing circuitry 110. Controller 106 is not limited to controlling vehicles. Controller 106 may additionally or alternatively control any kind of controllable object, such as a robotic component. Processing circuitry 110 may include one or more central processing units (CPUs), such as single-core or multi-core CPUs, graphics processing units (GPUs), digital signal processor (DSPs), application specific integrated circuits (ASICs), field programmable gate arrays (FPGAs), neural processing unit (NPUs), multimedia processing units, and/or the like. Instructions applied by processing circuitry 110 may be loaded, for example, from memory 160 and may cause processing circuitry 110 to perform the operations attributed to processor(s) in this disclosure. In some examples, one or more of processing circuitry 110 may be based on an Advanced Reduced Instruction Set Computer (RISC) Machine (ARM) or a RISC five (RISC-V) instruction set.

An NPU is generally a specialized circuit configured for implementing control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processing circuitry 110 may also include one or more sensor processing units associated with camera(s) 104, and/or sensor(s) 108. For example, processing circuitry 110 may include one or more image signal processors associated with camera(s) 104 and/or sensor(s) 108, and/or a navigation processor associated with sensor(s) 108, which may include satellite-based positioning system components (e.g., Global Positioning System (GPS) or Global Navigation Satellite System (GLONASS)) as well as inertial positioning system components. In some aspects, sensor(s) 108 may include direct depth sensing sensors, which may function to determine a depth of or distance to objects within the environment surrounding processing system 100 (e.g., surrounding a vehicle).

Processing system 100 also includes memory 160, which is representative of one or more static and/or dynamic memories, such as a dynamic random-access memory, a flash-based static memory, and the like. In this example, memory 160 includes computer-executable components, which may be applied by one or more of the aforementioned components of processing system 100.

Examples of memory 160 include random access memory (RAM), read-only memory (ROM), electrically erasable programmable ROM (EEPROM), compact disk ROM (CD-ROM), or another kind of hard disk. Examples of memory 160 include solid state memory and a hard disk drive. In some examples, memory 160 is used to store computer-readable, computer-executable software including instructions that, when applied, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells. For example, the memory controller may include a row decoder, column decoder, or both. In some cases, memory cells within memory 160 store information in the form of a logical state.

Processing system 100 may be configured to perform techniques for extracting features from image data and position data, processing the features, fusing the features, or any combination thereof. For example, processing circuitry 110 may include BEV unit 140. BEV unit 140 may be implemented in software, firmware, and/or any combination of hardware described herein. As will be described in more detail below, BEV unit 140 may be configured to receive a plurality of camera images 168 captured by camera(s) 104. BEV unit 140 may be configured to receive camera images 168 directly from camera(s) 104, or from memory 160. In some examples, the plurality of camera images 168 may be referred to herein as "image data."

In general, BEV unit 140 may use an approach like Lift, Splat, Shoot (LSS) to generate Bird's Eye View (BEV) features from cameras which may be fused in BEV space using known camera geometry. As discussed below, BEV unit 140 may generate BEV images based on image data captured by multiple cameras (e.g., a two-dimensional (2D) images) in a manner that produces less data and thus reduces processor burdens, external data transfer delays, and power usage.

Lift, Splat, Shoot (LSS) generally generates dense depth distributions. In a lift stage, features in each image may be "lifted" from a local 2-dimensional coordinate system to a 3-dimensional (3D) frame that is shared across all cameras. The lift process is repeated for each camera of a multi-camera system (e.g., camera(s) 104). The splat process of LSS is then performed for all of the lifted images into a single representation (e.g., the BEV representation).

To accurately determine a 3D frame, depth information is used but the "depth" associated to each pixel is ambiguous. LSS uses representations at many possible depths for each pixel using a depth vector. The depth vector, or depth distribution, may be predicted by a machine learning model, such as a deep neural net (DNN). The depth distribution may be learnt using supervised depth or as a latent representation. In supervised learning, the ground truth depth from a measurement or a sensor, such as a LiDAR sensor, is used to train the machine learning model.

The depth vector is a plurality of depth estimate values along a ray from the camera center to a pixel in the image, where each value represents the probability that the pixel in the image is at a particular depth. Because the values of the depth vector are probabilities, the total of the values in the depth vector will add up to 1. The depth vector may be any length (e.g., number of possible depth values). The longer the depth vector, the more granular the depth values that may be detected, but at the cost of a larger data size. In one example, the depth vector length is 118, but other depth vector lengths may be used.

A context vector (also called a feature vector) may be constructed using a machine learning model for each pixel. The context vector may be related to attention and may indicate different possible identities or classifications for a pixel. The context vector includes a plurality of values that indicate the probability that a particular pixel represents a particular feature. That is, each value in the context vector may represent a different possible feature. For autonomous driving, example features may include cars, trucks, bikes, pedestrians, signs, bridges, road markings, curbs, or other physical objects in the world that may be used to make autonomous driving decisions. The number of values in the context vector is indicative of the number of features that are to be detected in the image. One example context vector length is 80, but more or fewer features may be detected depending on the use case.

To perform the lift process, BEV unit 140 may be configured to combine the depth vector and the context vector using an outer product operation. For a depth vector length ($D_{size}$) of 118 and a context vector length ($C_{size}$) of 80, this combination results in a large expansion of layer output volume (frustum_volume) as the layer output volume is proportional to the number of cameras (num_cameras), the image size (represented by image_width and image_height), the length of the depth vector ($D_{size}$), and the length of the context vector ($C_{size}$), as shown below:

$$\text{frustum\_volume}=\text{num\_cameras}*(\text{image\_width}/8)* \\ (\text{image\_height}/8)*D_{size}*C_{Size}$$

The factor of 8 in this equation is due to stride in the X and Y directions. Stride may be considered as a downsampling factor in input images. Even for small resolutions of 0.18 megapixels (MP) (704×256), output product calculation translates to 160 megabytes (MB). Larger resolution cameras, such as 2 MP, may result in 1.8 gigabytes GB of data. This amount of data may result in slow processing and may require a very large amount of memory, which is expensive. This problem increases as the number of cameras in automobiles goes up. The size of the output data may be reduced by making the length of the depth vector smaller. However, this is undesirable, as reducing the length of the depth vector reduces the accuracy and precision of depth determinations, which may lower the effectiveness of image segmentation and object detection processes that may be by an ADAS to make driving decisions.

In accordance with the techniques of this disclosure, BEV unit 140 may reduce the size of depth distribution (depth vector) and thus reduce the size of the resulting outer products, as described below. BEV unit 140 may produce a predicted depth peakiness factor for the depth vector for each pixel (which corresponds to a ray going from camera center to image pixel). For example, BEV unit 140 may include a DNN that is not only configured to determine the depth vector, but is also configured to determine a depth peakiness factor for each pixel based on the determined probability values in the depth vector. The depth peakiness factor is a value that generally indicates how uniform (e.g., non-peaky) or non-uniform (e.g., peaky), the values in the depth vector are. For example, if the depth vector includes a large number of probabilities that are of equal value, the predicted depth peakiness factor of the depth vector is low. If the depth vector includes very few large probabilities and a large number of near zero probability values, the predicted depth peakiness factor of the depth vector is high. Other distributions of probability values in the depth vector may produce depth peakiness factor values between high and low.

The predicted depth peakiness factor may have a range of values, such as from 0.0 to 1.0. For example, if BEV unit 140 produces probability values in the depth vector that have few large probabilities at any depths of the depth factor for a specific ray (pixel), then BEV unit 140 may output a predicted depth peakiness factor close to 0.0. If the DNN determines that a few, or even one, probability values in the depth vector that are very high (e.g., near 1 probability), BEV unit 140 is very confident about depth in a specific ray (pixel). In this case, the DNN of BEV unit 140 may output a predicted depth peakiness factor close to 1.0. If BEV unit 140 has a moderate confidence in the depth (e.g., the probability values are neither very peaky nor very uniform), BEV unit 140 may produce a moderate predicted depth peakiness factor between 0.0 and 1.0.

BEV unit 140 may categorize the peakiness of the depth vector as low, moderate or high confidence. For example, a low confidence group may have a predicted depth peakiness factor from 0.0 to a low confidence threshold (low_conf_th), a moderate confidence group may have predicted depth peakiness factor from low_conf_th to a moderate confidence threshold (mod_conf_th), and a high confidence group may have predicted depth peakiness factor from mod_conf_th to 1.0. Any threshold values may be used. In one example, the low_conf_th is 0.1 and the mod_conf_th is 0.8.

BEV unit 140 may determine to use a uniform distribution for the depth vector if the depth vector for ray (pixel) is categorized as low confidence based on the predicted depth peakiness factor. A uniform depth distribution is used in some algorithms such as Orthographic Feature Transform for Monocular 3D Object Detection. When using a uniform distribution, a ray passing through the camera center and a pixel is assumed to have all depths with equal probability starting from a minimum depth (min_depth) to a maximum depth (max_depth). For example, for a depth vector of size 118, every probability value of the depth vector would be assigned to be 1/118 when using a uniform distrubution. Since this single depth probability (e.g., 1/118) is used for every bin, BEV unit 140 may store the outer product in a compressed form.

BEV unit 140 may use the single depth probability in the depth vector that has the highest probability if the DNN determines that the predicted depth peakiness factor is in the high confidence category. Such a single peak depth distribution is similar to a scenario with a range sensor such as Lidar that only returns a single depth value per point. Using a single depth value from the depth vector avoids volume expansion since only a single depth bin need be used. As such, rather than having a 118×80 outer product, only a 1×80 product is needed.

If predicted depth peakiness factor indicates that the peakiness of the depth vector for the ray (pixel) is categorized as moderate confidence, BEV unit 140 may use a simplified depth vector, having N bins of the depth vector that have the highest probabilities. N may be a relatively small number like 4 or 5 which is much smaller than 118 bins discussed above. When 118 bins are used and the data per image is ~1.8 GB of input volume expansion in case of lift part of LSS's expensive external memory transfer in terms of execution cycles (hence higher latency) and higher power. When each ray (pixel) uses moderate confidence with N=4, the input volume may be reduced to 60 MB assuming each ray is of moderate confidence. Such a data size may come down even further if some depth vectors fall into the low or high confidence category. Thus, the processor burdens, external data transfer delays, and power usage is reduced.

In summary, BEV unit 140 may generate a respective context vector for each pixel of the image data. A machine learning model (e.g., a neural network) at BEV unit 140 may generate the context vector. BEV unit 140 may generate a respective initial depth distribution for each pixel of the image data. The initial depth distribution (e.g., a depth vector) may be a depth vector that gives a probability distribution for a depth of a pixel. A machine learning model (e.g., a DNN) at BEV unit 140 may generate the initial depth distribution. BEV unit 140 may determine (e.g., using the same DNN as for the initial depth distribution), for each pixel of the image data, a respective predicted depth peakiness factor based on the respective initial depth distribution. The respective predicted depth peakiness factor may indicate a confidence of a depth for the pixel. BEV unit 140 may determine a respective final depth distribution for each pixel based on the respective predicted depth peakiness factor and the respective initial depth distribution. BEV unit 140 may generate a bird's eye view (BEV) image using the respective final depth distribution for each pixel of the image data and the respective context vector for each pixel of the image data.

BEV unit 140 may determine a respective probability at each bin of the initial depth distribution; and determine the respective predicted depth peakiness factor based on the respective probability at each bin. BEV unit 140 may compute an outer product from the respective final depth distribution and the respective context vector to generate the bird's eye view (BEV) image. When the respective predicted depth peakiness factor for a pixel of the image data indicates a low confidence, BEV unit 140 may determine the respective final depth distribution to be a uniform distribution of depth values for the pixel of the image data. When the respective predicted depth peakiness factor for a pixel of the image data indicates a high confidence, BEV unit 140 may determine the respective final depth distribution to be a single depth value for the pixel of the image data. When the respective predicted depth peakiness factor for a pixel of the image data indicates a medium confidence, BEV unit 140 may determine the respective final depth distribution to be a subset of bins having non-zero values of the respective initial depth distribution.

The subset of bins from the initial depth distribution used in the final depth distribution may be the N bins having highest confidence values (highest bin values in the initial depth vector). BEV unit 140 may generate the respective predicted depth peakiness factor and the respective initial depth distribution for each pixel of the image data using at least one machine learning model. BEV unit 140 may compare the respective predicted depth peakiness factor to at least one threshold to categorize the confidence of the depth as low, medium or high. The processing circuitry and the memory may be part of an advanced driver assistance system (ADAS) that uses an output generated based on the BEV image to control a vehicle.

In some examples, processing circuitry 110 may be configured to train one or more machine learning models such as encoders, decoders, positional encoding models, or any combination thereof applied by BEV unit 140 using training data 170. For example, training data 170 may include one or more training camera images along with ground truth data from a range sensor such as a LiDAR sensor. Training data 170 may additionally or alternatively include features known to accurately represent one or more point cloud frames and/or features known to accurately represent one or more camera images. This may allow processing circuitry 110 to train an encoder to generate features that accurately represent camera images.

Processing circuitry 110 of controller 106 may apply control unit 142 to control, based on the generated BEV image, an object (e.g., a vehicle, a robotic arm, or another object that is controllable based on the output from BEV unit 140) corresponding to processing system 100. Control unit 142 may control the object based on information included in the output generated by BEV unit 140 relating to one or more objects within a 3D space including processing system 100. For example, the output generated by BEV unit 140 may include BEV images, an identity of one or more objects, a position of one or more objects relative to the processing system 100, characteristics of movement (e.g., speed, acceleration) of one or more objects, or any combination thereof. Based on this information, control unit 142 may control the object corresponding to processing system 100. The output from BEV unit 140 may be stored in memory 160 as model output 172.

The techniques of this disclosure may also be performed by external processing system 180. That is, encoding input data, transforming features into BEV images, (including depth and context vector generation, predicted depth peakiness factor generation and thresholding, depth distribution data reduction and other features) may be performed by a processing system that does not include the various sensors shown for processing system 100. Such a process may be referred to as "offline" data processing, where the output is determined from camera images received from processing system 100. External processing system 180 may send an output to processing system 100 (e.g., an ADAS or vehicle).

External processing system 180 may include processing circuitry 190, which may be any of the types of processors described above for processing circuitry 110. Processing circuitry 190 may include a BEV unit 194 configured to perform the same processes as BEV unit 140. Processing circuitry 190 may acquire camera images from camera(s) 104, respectively, or from memory 160. Though not shown, external processing system 180 may also include a memory that may be configured to store camera images, model outputs, among other data that may be used in data processing. BEV unit 194 may be configured to perform any of the techniques described as being performed by BEV unit 140. Control unit 196 may be configured to perform any of the techniques described as being performed by control unit 142.

Figure 2:
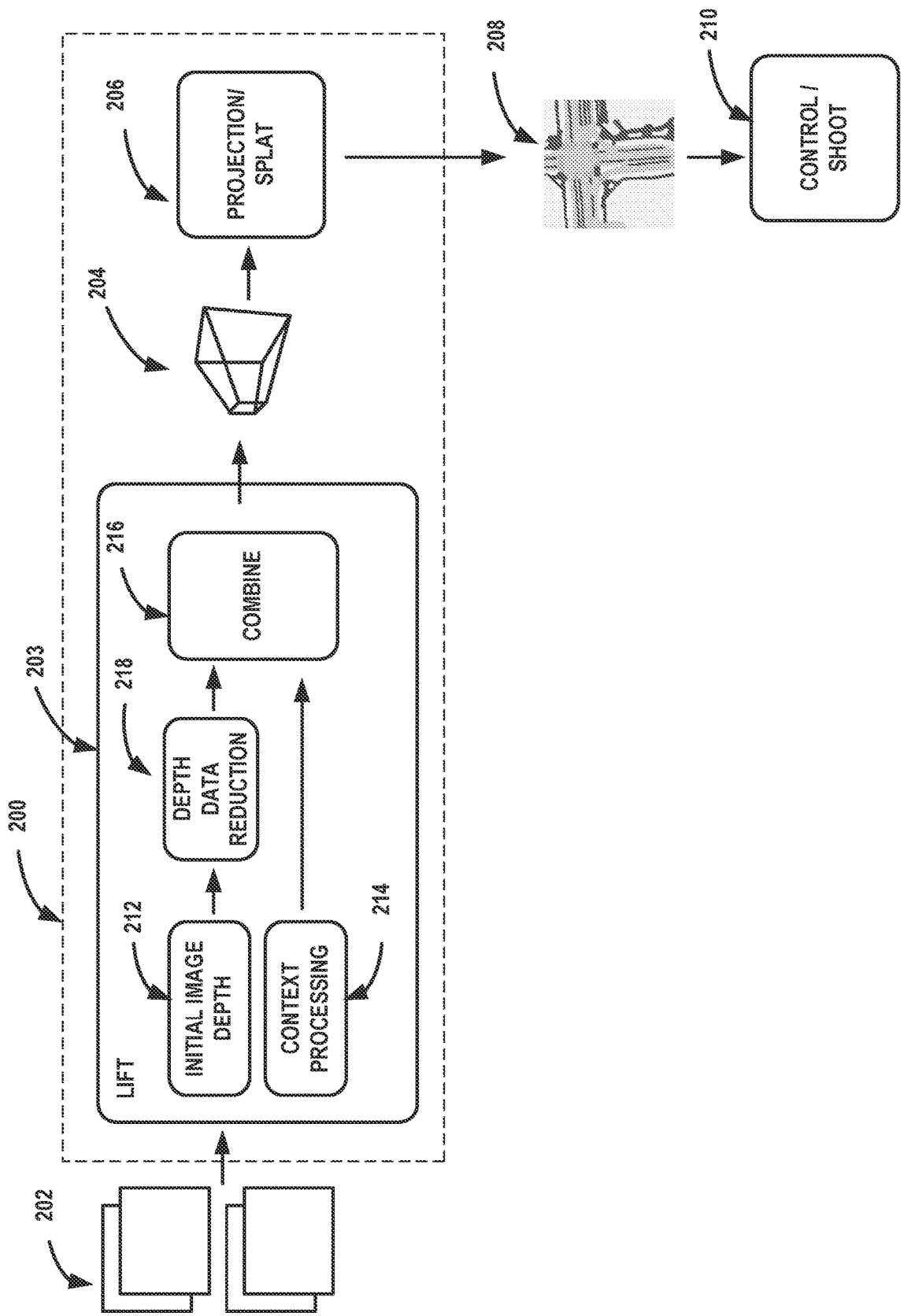
FIG. 2 is a block diagram illustrating an architecture for processing image data to generate a bird's eye view (BEV) output, in accordance with one or more techniques of this disclosure.

FIG. 2 is a block diagram illustrating an architecture for processing image data to generate a BEV output, in accordance with one to more techniques of this disclosure. FIG. 2 is a block diagram illustrating an architecture 200 for processing image data to generate an output, in accordance with one to more techniques of this disclosure. In some examples, architecture 200 may be a part of BEV unit 140 and/or BEV unit 194 of FIG. 1. FIG. 2 illustrates camera images 202, lift unit 203, projection unit 206, and control/shoot unit 210.

Camera images 202 may be examples of camera images 168 of FIG. 1. In some examples, camera images 202 may represent a set of camera images from camera images 168 and camera images 168 may include one or more camera images that are not present in camera images 202. In some examples, camera images 202 may be received from a plurality of cameras at different locations and/or different fields of view, which may be overlapping. In some examples, architecture 200 processes camera images 202 in real-time or near real-time so that as camera(s) 104 captures camera images 202, architecture 200 processes the captured camera images. In some examples, camera images 202 may represent one or more perspective views of one or more objects within a 3D space where processing system 100 is located. That is, the one or more perspective views may represent views from the perspective of processing system 100.

Architecture 200 may transform camera images 202 into BEV images 208 that represent the one or more objects within the 3D environment on a grid from a perspective looking down at the one or more objects from a position above the one or more objects. Since architecture 200 may be part of an ADAS for controlling a vehicle, and since vehicles move generally across the ground in a way that is observable from a BEV perspective, generating BEV images 208 may allow a control unit (e.g., control unit 142 and/or control unit 196) of FIG. 1 to control the vehicle based on the representation of the one or more objects from a bird's eye perspective. Architecture 200 is not limited to generating BEV images 208 for controlling a vehicle. Architecture 200 may generate BEV images 208 for controlling another object such as a robotic arm and/or perform one or more other tasks involving image segmentation, depth detection, object detection, or any combination thereof.

Architecture 200 may include a number of units that may be implemented with machine learning models. Lift unit 203 may "lift" images into 3D by generating a frustum-shaped representation 204 of contextual features. Projection unit 206 may then "splat" multiple frustum representations for multiple cameras into BEV images 208. Control unit 210 (corresponding to control unit 142 or control unit 196 of FIG. 1) may use the BEV images 208 to control the operation of a unit such as a vehicle or robot.

Lift unit 203 may "lift" each image from a local 2-dimensional coordinate system to a 3-dimensional frame shared across multiple cameras. Lift unit 203 may determine for each pixel of 2-D camera images 202 (that corresponds to a ray from the environment into the camera) a depth distribution.

Lift unit 203 may receive camera images 202 and process the camera images 202 in two branches. A depth vector branch including initial image depth unit 212 may be used to create a depth vector for each pixel of camera image 202. The depth vector may have components or bins with values which indicate the probability of an object being at depth corresponding to the component or bin. For example, a depth vector with 118 bins has 118 depth regions from a closest to a furthest distance with values corresponding to a probability of an object being located at each bin.

A context vector branch, including context processing unit 214, creates a context vector for each pixel that has a number of parameters that relate to a context or attention. For example, a context vector of length 80 will have 80 potential context or attention parameters. Each parameter of the context vector may effectively keep track of a different context.

Combine unit 216 may combine the depth vector and context vector using an outer product. The outer product of two vectors is a matrix whose entries are all products of elements of the first vector multiplied with an element of the second vector. If two vectors have dimensions c and d, then the outer product is a c×d matrix. When the depth vector has 118 elements and the context vector has 80 elements then the outer product has 9440 elements. Combine unit 216 may create an outer product for each of the pixels of each image (subject to the depth data reduction discussed below). The lift unit 203 may use the outer products for each pixel to create frustum-shaped representations 204 that indicate predictions of the depth values in the image. A frustum is a portion of a pyramid defined within two parallel planes; in this case the pyramid is defined by the rays from the camera defined by the pixels and the two parallel planes are defined by minimum and maximum defined distances. Frustum-shaped representation 204 may be a frustum-shaped point cloud of contextual features.

Depth data reduction unit 218 may convert an initial depth vector from the initial image depth unit 212 into a simplified representation which reduces the amount of data needed for or used in the outer products produced by combine unit 216. Details of operation of the depth data reduction 218 is described below with respect FIGS. 3 and 5.

Depth data reduction unit 218 may determine the confidence based on a predicted peakiness factor and determine what probabilities to use for the outer product operation. The predicted depth peakiness factor may indicate how flat or peaky the initial depth distribution is. For example, a perfectly flat initial depth distribution may have a predicted depth peakiness factor of zero and an initial depth distribution with a single depth value may have a predicted depth peakiness factor of one. The predicted depth peakiness factor may be produced using a machine learning model or a fixed algorithm, such as the Gini coefficient.

Lift unit 203 may be trained by using camera data along with a ground truth representation of frustum-shaped representation 204. For example, a Lidar or other range sensor may produce a ground truth indication of a frustum corresponding to images. The training device may then train the machine learning models of lift unit 203.

Lift unit 203 may produce multiple frustum-shaped representations 204 for data images from multiple cameras. Projection unit 206 may splat or squash the multiple frustum-shaped representations 204 into a bird's eye view plane to produce BEV images 208. The frustum-shaped representations 204 includes depth and context/attention information which projection unit 206 may use to identify objects such as lanes, pedestrians, cars, buildings and other objects for use in object tracking and path planning. Control/shoot unit 210 may then use the BEV images 208 to control the operation of a device such as a vehicle or a robot.

Architecture 200 may use machine learning models such as convolutional neural network (CNN) layers to analyze the input data in a hierarchical manner. The CNN layers may apply filters to capture local patterns and gradually combine them to form higher-level features. Each convolutional layer extracts increasingly complex visual representations from the input data. These representations may be compressed and down-sampled through operations such as pooling or strided convolutions, reducing spatial dimensions while preserving desired information. The final output of the encoder may represent a flattened feature vector that encodes the input data's high-level visual features.

During training, architecture 200, lift unit 203, projection unit 206 and control unit 210 may be trained using a loss function that measures the discrepancy between images and the ground truth image. This loss guides the learning process, encouraging the encoder to capture meaningful features and the decoder to produce accurate reconstructions. The training process may involve minimizing the difference between the generated image and the ground truth image, typically using backpropagation and gradient descent techniques. architecture 200, lift unit 203, projection unit 206 and control unit 210 may be trained using training data 170.

Figure 3:
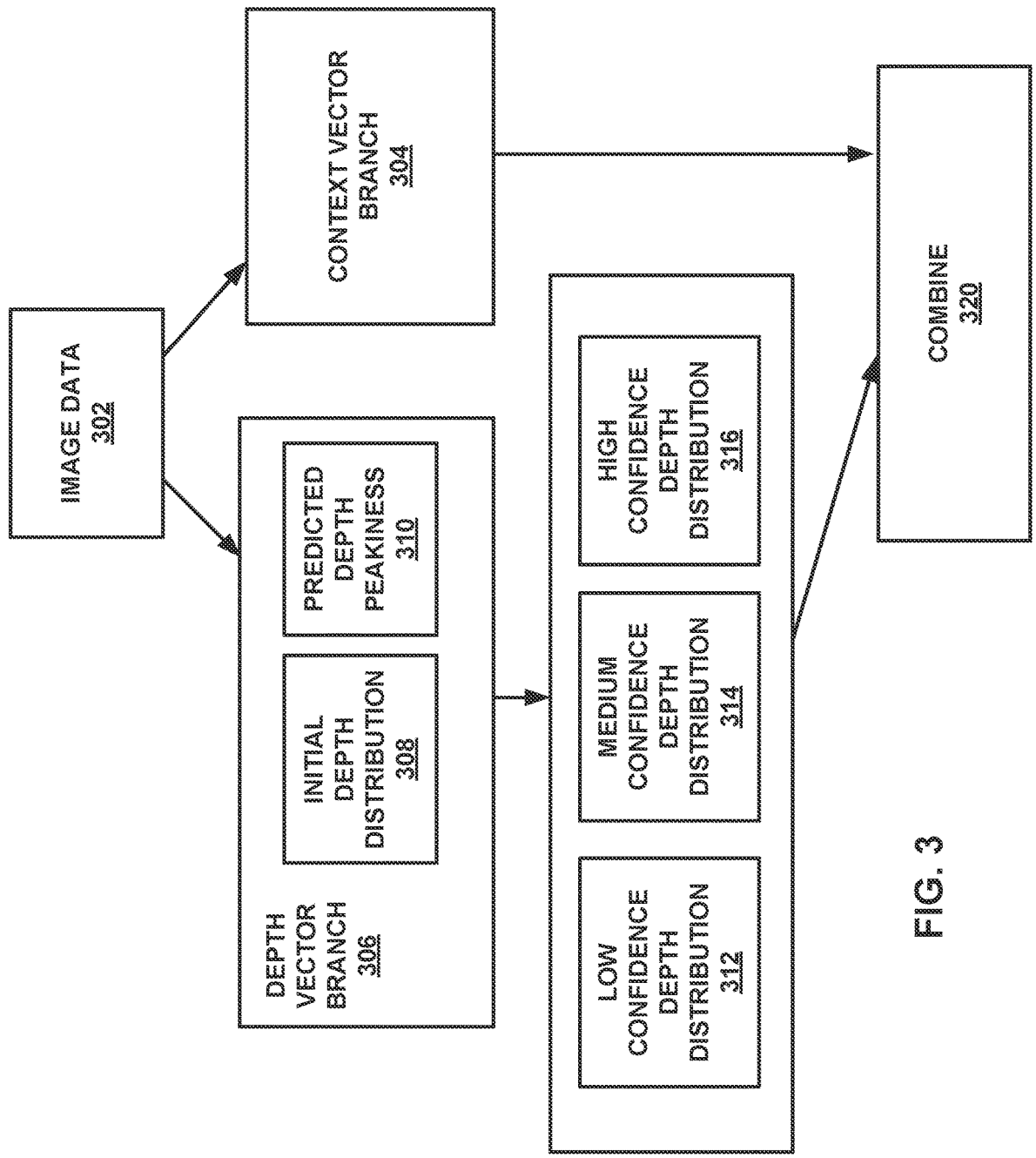
FIG. 3 is a flow diagram illustrating a lift stage used to "lift" 2D images into 3D, in accordance with one or more techniques of this disclosure.

FIG. 3 is a flow diagram illustrating a lift stage used to "lift" 2D images into 3D, in accordance with one or more techniques of this disclosure. The functions of the flow diagram of FIG. 3 may be implemented using BEV units 140 and 194 of FIG. 1 and/or architecture 200 and lift unit 203 of FIG. 2.

Image data 302 may be provided for two different branches: context vector branch 304 corresponding to context processing unit 214 of FIG. 2; and depth vector branch processing 306 corresponding to initial image depth unit 212 and depth data reduction unit 218 of FIG. 2. In depth vector branch processing 306, an initial depth distribution 308 is created for each pixel of the image data 302. The depth vector is a plurality of depth estimate values along a ray from the camera center to a pixel in the image, where each value represents the probability that the pixel in the image is at a particular depth Also, for each pixel, a predicted depth peakiness factor 310 is created based on the initial depth distribution 308. The context vector may be related to attention and may indicate different possible identities or classifications for a pixel. The context vector includes a plurality of values that indicate the probability that a particular pixel represents a particular feature. A DNN may be configured to determine the depth vector, but is also configured to determine a depth peakiness factor for each pixel based on the determined probability values in the depth vector. The depth peakiness factor is a value that generally indicates how uniform (e.g., non-peaky) or non-uniform (e.g., peaky), the values in the depth vector are.

If the depth vector includes a large number of probabilities that are of equal value, the predicted depth peakiness factor of the depth vector is low. For a low predicted depth peakiness factor 312, a constant value may be used for the probability at each of the depth bins in a depth vector. This allows the combine unit 320 to avoid a full outer product operation for the pixel and instead merely multiply the contact vector by the constant value.

If the depth vector includes very few large probabilities and a large number of near zero probability values, the predicted depth peakiness factor of the depth vector is high. For a high predicted depth peakiness factor 316, a single value for the depth distribution may be used such as a single bin value.

Other distributions of probability values in the depth vector may produce depth peakiness factor values between high and low. For a medium predicted depth peakiness factor 314, the depth distribution may be represented by a smaller number, N, of depth vector values (the other bin values may be set to zero). This also simplifies the operation of combine unit 320 since rather than 181 values a smaller value, N, may be used in the outer product.

Figure 4:
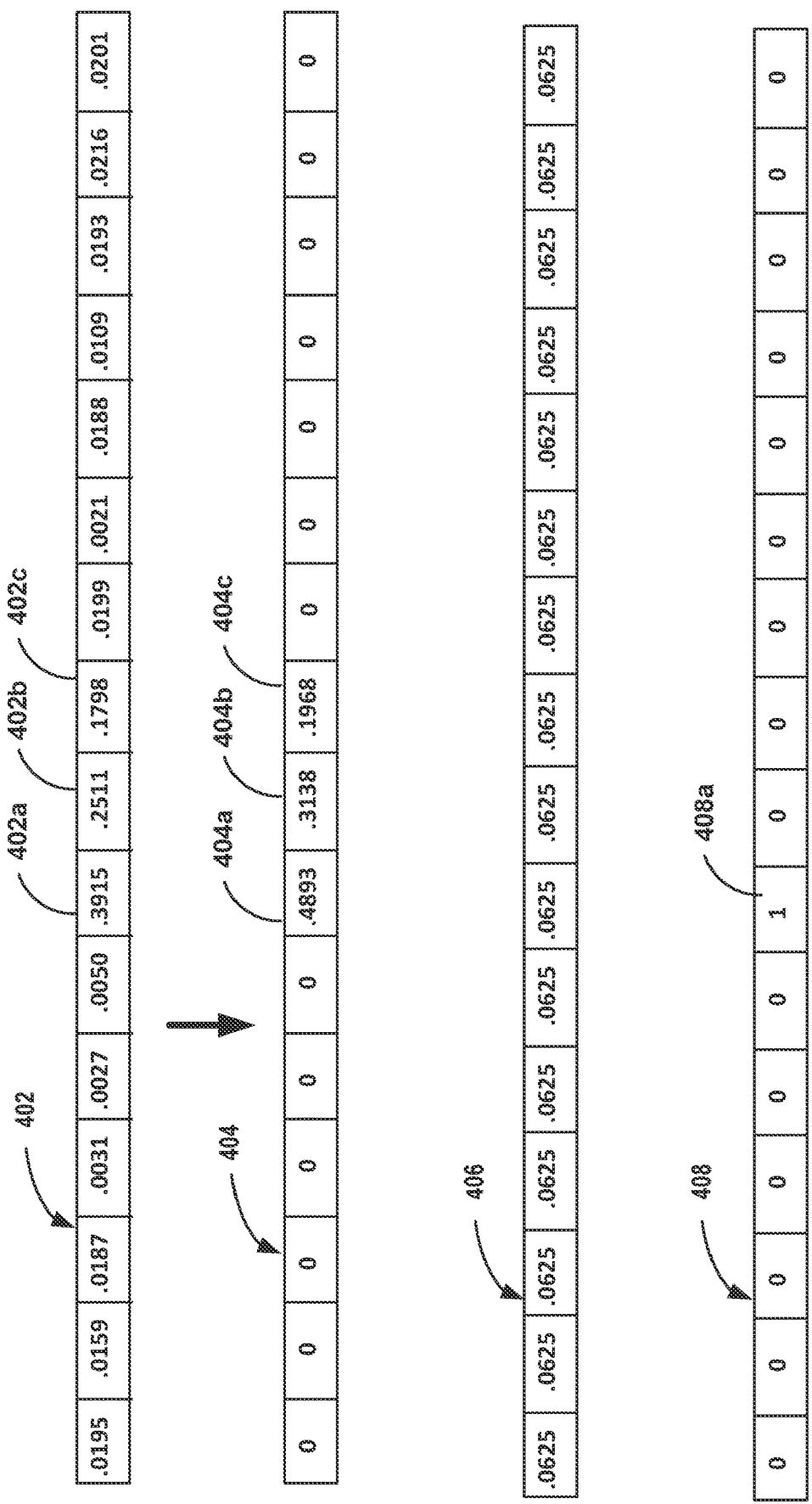
FIG. 4 is a diagram of exemplary depth vectors, in accordance with one or more techniques of this disclosure.
Figure 5:
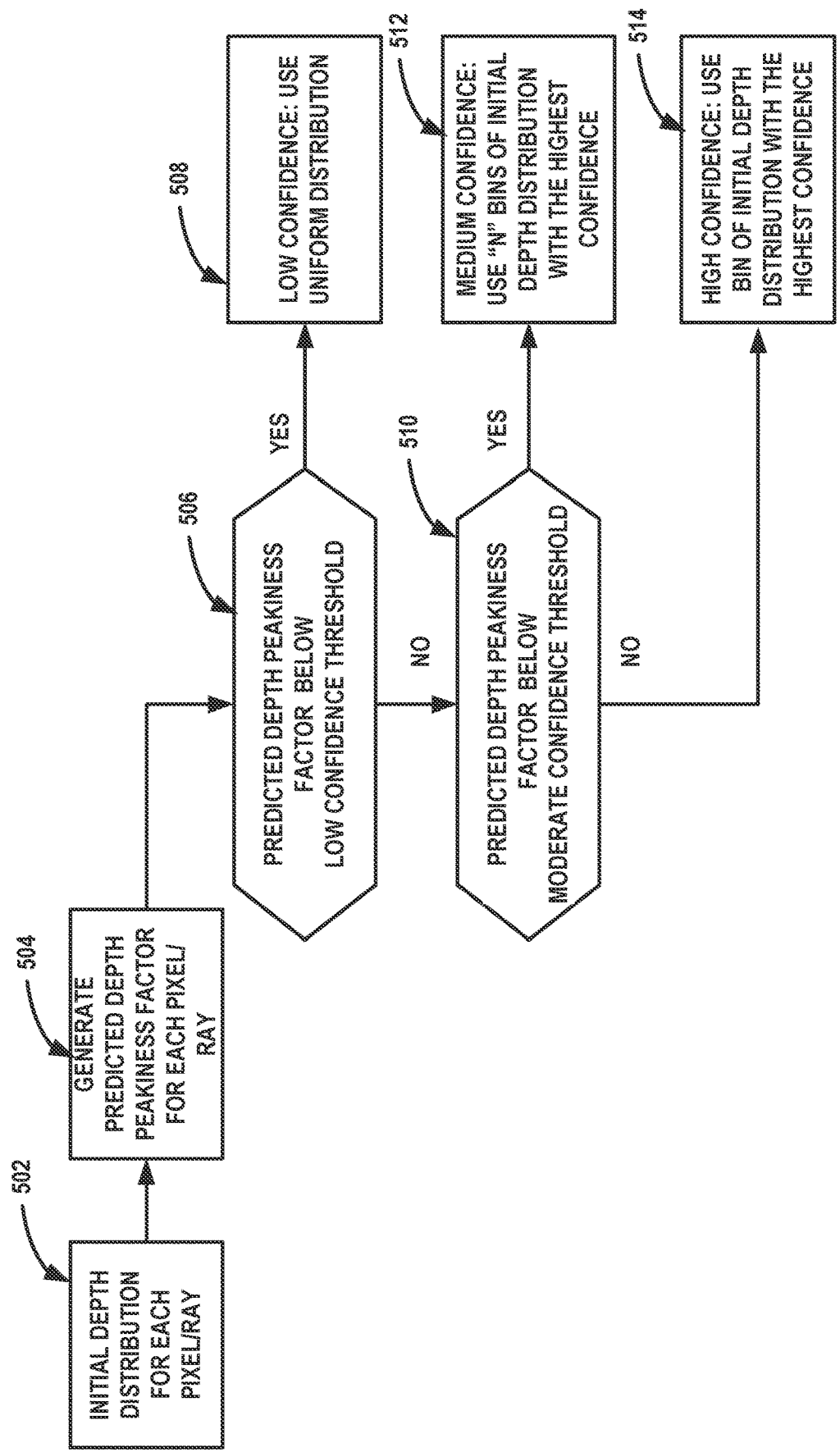
FIG. 5 is a flow diagram illustrating the generation and use of a predicted depth peakiness factor for pixels/rays of image data, in accordance with one or more techniques of this disclosure.

FIG. 4 is a diagram of exemplary depth vectors, in accordance with one or more techniques of this disclosure. The depth vectors of FIG. 4 are representational examples showing 16 bins for ease of explanation. In this example, the depth vectors have bins with probabilities that add up to 1. Depth vector 402 is an initial depth vector such as that produced by initial image depth unit 212 of FIG. 2. Depth vector 202 has three bins 402a, 402b, and 402c that have probability values well higher than the other bins. In this example, the initial depth vector 402 is characterized as being of middle confidence peakiness and the top N (such as three) bins are selected with the other bins to be set to zero. Depth vector 404 is a final depth vector, corresponding to initial depth vector 402, with bins 404a, 404b and 404c renormalized such that the probabilities add up to one and with the other bins set to zero. Depth vector 408 is a high confidence final depth vector with a single bin (bin 408a) set to a probability of one and the other bins set to a probability of zero. Depth vector 406 is a low confidence final depth vector where each bin has the same value (i.e., 1/16 or 0.0625) for all 16 bins. FIG. 5 is a flow diagram illustrating the generation and use of a predicted depth peakiness factor for pixels/rays of image data, in accordance with one or more techniques of this disclosure. FIG. 5 illustrates the use of threshold to categorize the generated predicted depth peakiness factors. The functions of the flow diagram of FIG. 5 may be implemented using architecture 200 and lift unit 203 of FIG. 2.

Lift unit 203 may create an initial depth distribution for each pixel/ray (502). The initial depth distribution may be created using a machine learning model as discussed above. Lift unit 203 may create a predicted depth peakiness factor based on the initial depth distribution (504). Lift unit 203 may compare the predicted depth peakiness factor to thresholds to characterize initial depth vectors. Lift unit 203 may check if the predicted depth peakiness factor is below a low confidence threshold (506). If so, then a uniform distribution is used rather than the initial depth distribution (508). If the predicted depth peakiness factor is above the low confidence threshold, lift unit 203 checks whether the predicted depth peakiness factor is below the moderate confidence threshold (510). If so, lift unit 203 uses a medium confidence distribution out of N bins of the initial depth distribution with the highest confidence values (512). That is the depth vector (depth distribution) may have N non-zero values. If not, lift unit 203 uses a high confidence depth distribution in which a single bin of the initial death distribution with the highest confidence is used (514).

Figure 6:
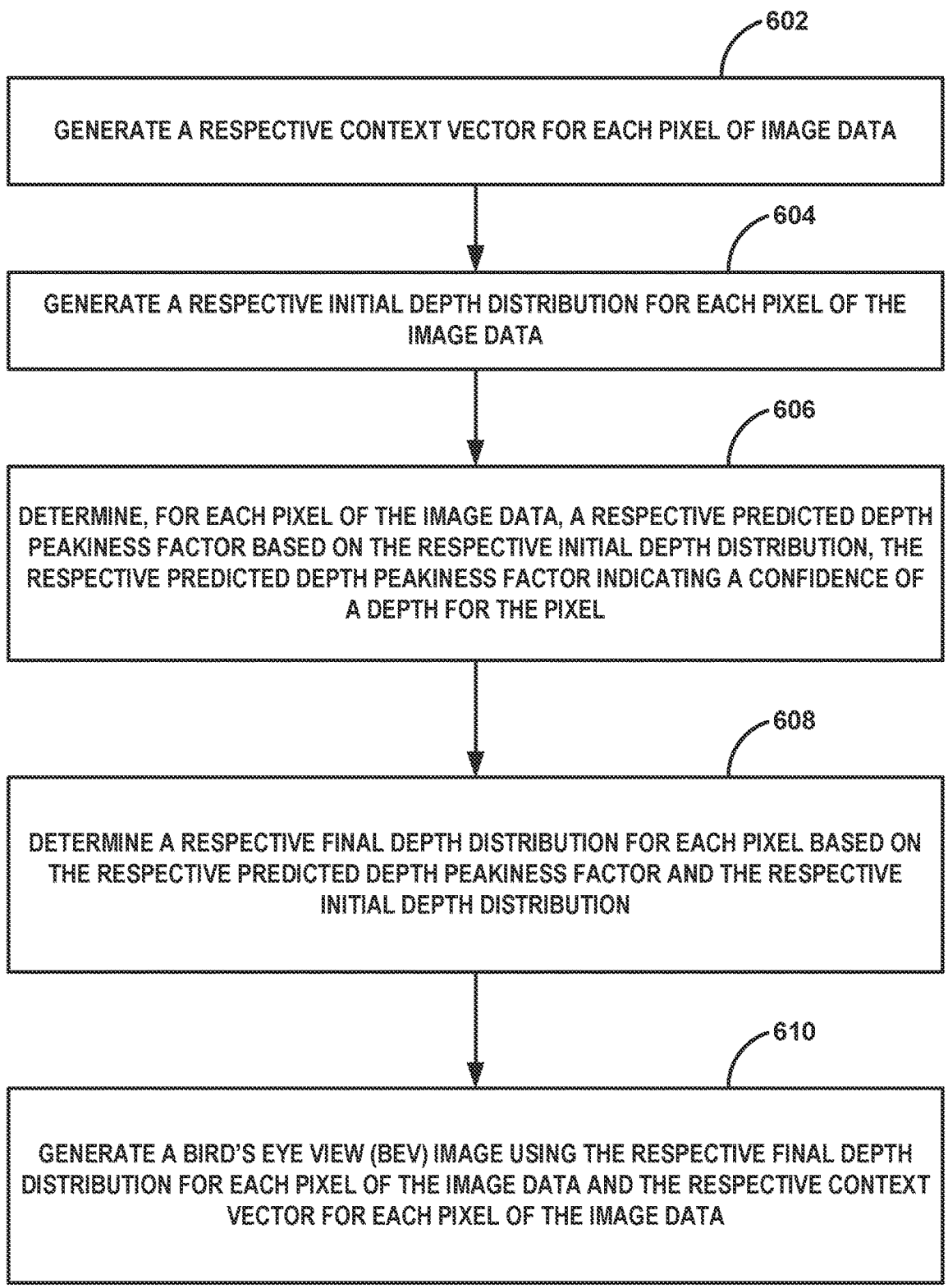
FIG. 6 is a flow diagram illustrating an example method for processing image data using a predicted depth peakiness factor to reduce data size used in the algorithm, in accordance with one or more techniques of this disclosure.

FIG. 6 is a flow diagram illustrating an example method for calculating a weighted summation based on image data features and position data features, in accordance with one or more techniques of this disclosure. FIG. 6 is described with respect to processing system 100 and external processing system 180 of FIG. 1, architecture 200 and lift unit 203 of FIG. 2, and the methods discussed in FIGS. 3 and 5. However, the techniques of FIG. 6 may be performed by different components of processing system 100, external processing system 180, architecture 200, or by additional or alternative systems.

Lift unit 203 may generate a respective context vector for each pixel of the image data (602). Lift unit 203 may generate a respective initial depth distribution for each pixel of the image data (604). Lift unit 203 may determine, for each pixel of the image data, a respective predicted depth peakiness factor based on the respective initial depth distribution, the respective predicted depth peakiness factor indicating a confidence of a depth for the pixel (606). Lift unit 203 may determine a respective final depth distribution for each pixel based on the respective predicted depth peakiness factor and the respective initial depth distribution (608). Lift unit 203 may generate a bird's eye view (BEV) image using the respective final depth distribution for each pixel of the image data and the respective context vector for each pixel of the image data.

Additional aspects of the disclosure are detailed in numbered clauses below.

Clause 1—An apparatus for processing image data, the apparatus comprising a memory for storing the image data; and processing circuitry in communication with the memory, wherein the processing circuitry is configured to generate a respective context vector for each pixel of the image data; generate a respective initial depth distribution for each pixel of the image data; determine, for each pixel of the image data, a respective predicted depth peakiness factor based on the respective initial depth distribution, the respective predicted depth peakiness factor indicating a confidence of a depth for the pixel; determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

Clause 2—The apparatus of clause 1, wherein the processing circuitry is configured to determine a respective probability at each bin of the respective initial depth distribution; and determine the respective predicted depth peakiness factor based on the respective probability at each bin.

Clause 3—The apparatus of any of clauses 1-2, wherein the processing circuitry is configured to compute an outer product from the respective final depth distribution and the respective context vector to generate the bird's eye view (BEV) image:

Clause 4—The apparatus of any of clauses 1-3, wherein when the respective predicted depth peakiness factor for a pixel of the image data indicates a low confidence, the processing circuitry is configured to determine the respective final depth distribution to be a uniform distribution of depth values for the pixel of the image data.

Clause 5—The apparatus of any of clauses 1-3, wherein when the respective predicted depth peakiness factor for a pixel of the image data indicates a high confidence, the processing circuitry is configured to determine the respective final depth distribution to be a single depth value for the pixel of the image data.

Clause 6—The apparatus of any of clauses 1-3, wherein when the respective predicted depth peakiness factor for a pixel of the image data indicates a medium confidence, the processing circuitry is configured to determine the respective final depth distribution to be a subset of bins having non-zero values of the respective initial depth distribution.

Clause 7—The apparatus of clause 6, wherein the subset of bins from the respective initial depth distribution is N bins having highest confidence values.

Clause 8—The apparatus of any of clauses 1-7, wherein the processing circuitry is configured to generate the respective predicted depth peakiness factor and the respective initial depth distribution for each pixel of the image data using at least one machine learning model.

Clause 9—The apparatus of any of clauses 1-8, wherein the processing circuitry is configured to compare the respective predicted depth peakiness factor to at least one threshold to categorize the confidence of the depth as low, medium or high.

Clause 10—The apparatus of any of clauses 1-9, wherein the processing circuitry and the memory are part of an advanced driver assistance system (ADAS).

Clause 11—The apparatus of any of clauses 1-10, wherein the processing circuitry is configured to use an output generated based on the BEV image to control a vehicle.

Clause 12—The apparatus of any of clauses 1-11, wherein the image data corresponds to one or more camera images.

Clause 13—The apparatus of any of clauses 1-12, wherein the apparatus further comprises: one or more cameras configured to capture the one or more camera images.

Clause 14—A method comprising: generating a respective context vector for each pixel of image data; generating a respective initial depth distribution for each pixel of the image data; determining, for each pixel of the image data, a respective predicted depth peakiness factor based on the respective initial depth distribution, the respective predicted depth peakiness factor indicating a confidence of a depth for the pixel; determining a respective final depth distribution for each pixel based on the respective predicted depth peakiness factor and the respective initial depth distribution; and generating a bird's eye view (BEV) image using the respective final depth distribution for each pixel of the image data and the respective context vector for each pixel of the image data.

Clause 15—The method of clause 14, further comprising: determining a respective probability at each bin of the respective initial depth distribution; and determining the respective predicted depth peakiness factor based on the respective probability at each bin.

Clause 16—The method of any of clauses 14-15, further comprising computing an outer product from the respective final depth distribution and the respective context vector to generate the bird's eye view (BEV) image.

Clause 17—The method of any of clauses 14-16, wherein when the respective predicted depth peakiness factor for a pixel of the image data indicates a low confidence, the respective final depth distribution is a uniform distribution of depth values for the pixel of the image data.

Clause 18—The method of any of clauses 14-16, wherein when the respective predicted depth peakiness factor for a pixel of the image data indicates a high confidence, the respective final depth distribution is a single depth value for the pixel of the image data.

Clause 19—The method of any of clauses 14-16, wherein when the respective predicted depth peakiness factor for a pixel of the image data indicates a medium confidence, the respective final depth distribution to be a subset of bins having non-zero values of the respective initial depth distribution.

Clause 20—The method of claim 19, wherein the subset of bins from the respective initial depth distribution is N bins having highest confidence values.

Clause 21—The method of any of clauses 14-20, further comprising:
generating the respective predicted depth peakiness factor and the respective initial depth distribution for each pixel of the image data using at least one machine learning model.

Clause 22—The method of any of clauses 14-21, further comprising: comparing the respective predicted depth peakiness factor to at least one threshold to categorize the confidence of the depth as low, medium or high.

Clause 23—The method of any of clauses 14-22, wherein the method is performed by an advanced driver assistance system (ADAS), the method further comprising: using an output generated based on the BEV image to control a vehicle.

Clause 24—The method of any of clauses 14-23, wherein the image data corresponds to one or more camera images.

Clause 25—A non-transitory computer-readable medium storing instructions that, when executed, cause processing circuitry to: generate a respective context vector for each pixel of the image data; generate a respective initial depth distribution for each pixel of the image data; determine, for each pixel of the image data, a respective predicted depth peakiness factor based on the respective initial depth distribution, the respective predicted depth peakiness factor indicating a confidence of a depth for the pixel; determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

Clause 26—The non-transitory computer-readable medium of claim 25, wherein the instructions further cause the processing circuitry to: determine a respective probability at each bin of the respective initial depth distribution; and determine the respective predicted depth peakiness factor based on the respective probability at each bin.

Clause 27—The non-transitory computer-readable medium of any of clauses 25-26, wherein the instructions further cause the processing circuitry to compute an outer product from the respective final depth distribution and the respective context vector to generate the bird's eye view (BEV) image.

Clause 28—The non-transitory computer-readable medium of any of clauses 25-27, wherein when the respective predicted depth peakiness factor for a pixel of the image data indicates a low confidence, the instructions further cause the processing circuitry to determine the respective final depth distribution to be a uniform distribution of depth values for the pixel of the image data.

Clause 29—The non-transitory computer-readable medium of any of clauses 25-27, wherein when the respective predicted depth peakiness factor for a pixel of the image data indicates a high confidence, the instructions further cause the processing circuitry to determine the respective final depth distribution to be a single depth value for the pixel of the image data.

Clause 30—The non-transitory computer-readable medium of any of clauses 25-27, wherein when the respective predicted depth peakiness factor for a pixel of the image data indicates a medium confidence, the instructions further cause the processing circuitry to determine the respective final depth distribution to be a subset of bins having non-zero values of the respective initial depth distribution.

Clause 31—An apparatus comprising means for performing any combination of techniques of Clauses 14-24.

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and applied by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be applied by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for processing image data, the apparatus comprising:
    a memory for storing the image data; and
    processing circuitry in communication with the memory, wherein the processing circuitry is configured to:
        generate a respective context vector for each pixel of the image data;
        generate a respective initial depth distribution for each pixel of the image data;
        determine, for each pixel of the image data, a respective predicted depth peakiness factor based on the respective initial depth distribution, the respective predicted depth peakiness factor indicating a confidence of a depth for the pixel;

determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

2. The apparatus of claim 1, wherein the processing circuitry is configured to:

determine a respective probability at each bin of the respective initial depth distribution; and determine the respective predicted depth peakiness factor based on the respective probability at each bin.

3. The apparatus of claim 1, wherein the processing circuitry is configured to compute an outer product from the respective final depth distribution and the respective context vector to generate the bird's eye view (BEV) image.

4. The apparatus of claim 1, wherein when the respective predicted depth peakiness factor for a pixel of the image data indicates a low confidence, the processing circuitry is configured to determine the respective final depth distribution to be a uniform distribution of depth values for the pixel of the image data.

5. The apparatus of claim 1, wherein when the respective predicted depth peakiness factor for a pixel of the image data indicates a high confidence, the processing circuitry is configured to determine the respective final depth distribution to be a single depth value for the pixel of the image data.

6. The apparatus of claim 1, wherein when the respective predicted depth peakiness factor for a pixel of the image data indicates a medium confidence, the processing circuitry is configured to determine the respective final depth distribution to be a subset of bins having non-zero values of the respective initial depth distribution.

7. The apparatus of claim 6, wherein the subset of bins from the respective initial depth distribution is N bins having highest confidence values.

8. The apparatus of claim 1, wherein the processing circuitry is configured to generate the respective predicted depth peakiness factor and the respective initial depth distribution for each pixel of the image data using at least one machine learning model.

9. The apparatus of claim 1, wherein the processing circuitry is configured to compare the respective predicted depth peakiness factor to at least one threshold to categorize the confidence of the depth as low, medium or high.

10. The apparatus of claim 1, wherein the processing circuitry and the memory are part of an advanced driver assistance system (ADAS).

11. The apparatus of claim 1, wherein the processing circuitry is configured to use an output generated based on the BEV image to control a vehicle.

12. The apparatus of claim 1, wherein the image data corresponds to one or more camera images.

13. The apparatus of claim 12, wherein the apparatus further comprises:

one or more cameras configured to capture the one or more camera images.

14. A method comprising:

generating a respective context vector for each pixel of image data;

generating a respective initial depth distribution for each pixel of the image data;

determining, for each pixel of the image data, a respective predicted depth peakiness factor based on the respective initial depth distribution, the respective predicted depth peakiness factor indicating a confidence of a depth for the pixel;

determining a respective final depth distribution for each pixel based on the respective predicted depth peakiness factor and the respective initial depth distribution; and generating a bird's eye view (BEV) image using the respective final depth distribution for each pixel of the image data and the respective context vector for each pixel of the image data.

15. The method of claim 14, further comprising:

determining a respective probability at each bin of the respective initial depth distribution; and determining the respective predicted depth peakiness factor based on the respective probability at each bin.

16. The method of claim 14, further comprising:

computing an outer product from the respective final depth distribution and the respective context vector to generate the bird's eye view (BEV) image.

17. The method of claim 14, wherein when the respective predicted depth peakiness factor for a pixel of the image data indicates a low confidence, the respective final depth distribution is a uniform distribution of depth values for the pixel of the image data.

18. The method of claim 14, wherein when the respective predicted depth peakiness factor for a pixel of the image data indicates a high confidence, the respective final depth distribution is a single depth value for the pixel of the image data.

19. The method of claim 14, wherein when the respective predicted depth peakiness factor for a pixel of the image data indicates a medium confidence, the respective final depth distribution is a subset of bins having non-zero values of the respective initial depth distribution.

20. The method of claim 19, wherein the subset of bins from the respective initial depth distribution is N bins having highest confidence values.

21. The method of claim 14, further comprising:

generating the respective predicted depth peakiness factor and the respective initial depth distribution for each pixel of the image data using at least one machine learning model.

22. The method of claim 14, further comprising:

comparing the respective predicted depth peakiness factor to at least one threshold to categorize the confidence of the depth as low, medium or high.

23. The method of claim 14, wherein the method is performed by an advanced driver assistance system (ADAS), the method further comprising:

using an output generated based on the BEV image to control a vehicle.

24. The method of claim 14, wherein the image data corresponds to one or more camera images.

25. A non-transitory computer-readable medium storing instructions that, when executed, cause processing circuitry to:

generate a respective context vector for each pixel of image data;

generate a respective initial depth distribution for each pixel of the image data;

determine, for each pixel of the image data, a respective predicted depth peakiness factor based on the respective initial depth distribution, the respective predicted depth peakiness factor indicating a confidence of a depth for the pixel;

determine a respective final depth distribution for each pixel based on the respective predicted depth peakiness factor and the respective initial depth distribution; and generate a bird's eye view (BEV) image using the respective final depth distribution for each pixel of the image data and the respective context vector for each pixel of the image data.

26. The non-transitory computer-readable medium of claim 25, wherein the instructions further cause the processing circuitry to:

determine a respective probability at each bin of the respective initial depth distribution; and determine the respective predicted depth peakiness factor based on the respective probability at each bin.

27. The non-transitory computer-readable medium of claim 25, wherein the instructions further cause the processing circuitry to compute an outer product from the respective final depth distribution and the respective context vector to generate the bird's eye view (BEV) image.

28. The non-transitory computer-readable medium of claim 25, wherein when the respective predicted depth peakiness factor for a pixel of the image data indicates a low confidence, the instructions further cause the processing circuitry to determine the respective final depth distribution to be a uniform distribution of depth values for the pixel of the image data.

29. The non-transitory computer-readable medium of claim 25, wherein when the respective predicted depth peakiness factor for a pixel of the image data indicates a high confidence, the instructions further cause the processing circuitry to determine the respective final depth distribution to be a single depth value for the pixel of the image data.

30. The non-transitory computer-readable medium of claim 25, wherein when the respective predicted depth peakiness factor for a pixel of the image data indicates a medium confidence, the instructions further cause the processing circuitry to determine the respective final depth distribution to be a subset of bins having non-zero values of the respective initial depth distribution.

* * * * *